(12) United States Patent
Kwon

(10) Patent No.: US 12,048,043 B2
(45) Date of Patent: *Jul. 23, 2024

(54) METHOD AND APPARATUS FOR OPERATING BUFFER STATE REPORT IN WIRELESS COMMUNICATION SYSTEM

(71) Applicant: Cisco Technology, Inc., San Jose, CA (US)

(72) Inventor: Ki Bum Kwon, Seoul (KR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,049

(22) Filed: May 16, 2023

(65) Prior Publication Data

US 2023/0284317 A1 Sep. 7, 2023

Related U.S. Application Data

(63) Continuation of application No. 17/200,726, filed on Mar. 12, 2021, now Pat. No. 11,696,357, which is a
(Continued)

(30) Foreign Application Priority Data

Aug. 8, 2014 (KR) .................. 10-2014-0102128
Nov. 6, 2014 (KR) .................. 10-2014-0153775

(51) Int. Cl.
*H04W 76/19* (2018.01)
*H04W 76/14* (2018.01)
(Continued)

(52) U.S. Cl.
CPC ........... *H04W 76/19* (2018.02); *H04W 76/14* (2018.02); *H04W 76/27* (2018.02); *H04W 28/0278* (2013.01)

(58) Field of Classification Search
CPC ..... H04W 76/19; H04W 76/14; H04W 76/27; H04W 28/0278
(Continued)

(56) References Cited

U.S. PATENT DOCUMENTS

2009/0213818 A1 8/2009 Park et al.
2010/0074222 A1 3/2010 Wu
(Continued)

FOREIGN PATENT DOCUMENTS

CN 101803245 A 8/2010
CN 101932019 A 12/2010
(Continued)

OTHER PUBLICATIONS

Examination Report in Indian Application No. 201717006195, mailed Jul. 2, 2020, 7 pages.
(Continued)

*Primary Examiner* — Kwang B Yao
*Assistant Examiner* — Syed M Bokhari

(57) ABSTRACT

A method of supporting a buffer status report (BSR) associated with a device-to-device (D2D) communication includes: establishing a radio resource control (RRC) connection with an evolved NodeB (eNB) and receiving configuration information associated with a D2D communication from the eNB, the configuration information including information of a resource allocation mode for a D2D data transmission and information of a timer associated with a BSR for a D2D data transmission; determining, by a user equipment (UE), a radio link failure (RLF), the RLF being associated with a connection problem of the RRC connection; initializing a re-establishment process for the RRC connection; canceling all BSRs for a D2D data transmission in response to the determined RLF, the canceled BSRs for a D2D data transmission being associated with a D2D data
(Continued)

transmission scheduled by the eNB; and initializing the timer associated with a BSR for a D2D data transmission.

20 Claims, 10 Drawing Sheets

Related U.S. Application Data continuation of application No. 16/837,362, filed on Apr. 1, 2020, now Pat. No. 10,986,687, which is a continuation of application No. 16/279,002, filed on Feb. 19, 2019, now Pat. No. 10,645,747, which is a continuation of application No. 14/820,443, filed on Aug. 6, 2015, now Pat. No. 10,257,878.

(51) Int. Cl.
 *H04W 76/27* (2018.01)
 *H04W 28/02* (2009.01)
(58) Field of Classification Search
 USPC .......................................................... 370/328
 See application file for complete search history.

(56) References Cited

U.S. PATENT DOCUMENTS

| | | | |
|---|---|---|---|
| 2011/0002262 | A1 | 1/2011 | Wang et al. |
| 2011/0164587 | A1 | 7/2011 | Seo |
| 2012/0069805 | A1 | 3/2012 | Feuersanger et al. |
| 2013/0028201 | A1 | 1/2013 | Koo et al. |
| 2013/0294337 | A1 | 11/2013 | Damnjanovic et al. |
| 2014/0056243 | A1 | 2/2014 | Pelletier et al. |
| 2014/0086152 | A1 | 3/2014 | Bontu et al. |
| 2015/0124748 | A1 | 5/2015 | Park et al. |
| 2015/0215981 | A1 | 7/2015 | Patil et al. |
| 2015/0271841 | A1 | 9/2015 | Yamada et al. |
| 2015/0282234 | A1* | 10/2015 | Sartori .............. H04W 28/0278 370/329 |

FOREIGN PATENT DOCUMENTS

| | | |
|---|---|---|
| CN | 103327536 A | 9/2013 |
| CN | 103460747 A | 12/2013 |
| KR | 20080067273 A | 7/2008 |
| KR | 20090084718 A | 8/2009 |
| KR | 20090106442 A | 10/2009 |
| WO | 2013025684 A1 | 8/2012 |
| WO | 2013191353 A1 | 12/2013 |

OTHER PUBLICATIONS

Extended European Search Report in European Application No. 19220086.3, mailed Mar. 19, 2020, 8 pages.

English Translation of First Office Action in Chinese Application No. 201580042489.1, mailed Aug. 20, 2019, 39 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.2.0, Jun. 2014, pp. 1-215, 3GPP Organizational Partners.
"3rd Generation Partnership Project; Technical Specification Group Radio Access Network; Evolved Universal Terrestrial Radio Access (E-UTRA); Medium Access Control (MAC) Protocol Specification (Release 12)," 3GPP TS 36.321 V12.2.1, Jun. 2014, pp. 1-57, 3GPP.
"3rd Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331 V12.2.0, Jun. 2014, pp. 1-365, 3GPP Organizational Partners.
International Search Report for International Patent Application No. PCT/KR2015/008254, dated Nov. 25, 2015, 3 pages.
Written Opinion for International Patent Application No. PCT/KR2015/008254, dated Nov. 25, 2015, 5 pages.
Intel Corp., "BSR reporting for D2D communication," R2-142048, 3GPP TSG-RAN WG2 Meeting #86, May 10, 2014, 4 pages.
European Search Report in Application No. 15829540.2, Mar. 16, 2018, 12 pages.
Ericsson, "Resource allocation details for D2D communication," R2-142429, 3GPP TSG-RAN WG2 Meeting #85bis, May 18, 2014, 20 pages.
Interdigitial Communications, "Mode selection for D2D communication," R2-142685, 3GPP TSG-RAN WG2 Meeting #86, May 18, 2014, 5 pages.
ETSI MCC, Report of 3GPP TSG RAN WG2 meeting #86, R2-143071, 3GPP TSG-RAN WG2 Meeting #86, May 28, 2014, 182 pages.
English Translation of Preliminary Rejection Office Action in Korean Application No. 10-2022-0146251, mailed Nov. 30, 2022, 7 pages.
Beatrice Martin, et al., "ETARE: Enabling Technologies for SDR Compliant Tactical Networks Mobile Ad Hoc Wideband Waveform(s)," IEEE, Jun. 22, 2011, 8 pages.
International Preliminary Report on Patentability for International Application No. PCT/KR2015/008254, mailed Feb. 23, 2017, 8 Pages.
Office Action in counterpart Chinese Application No. 202010776446.9, mailed Nov. 21, 2023, 15 pages.
Office Action in counterpart Chinese Application No. 202010776679.9, mailed Nov. 18, 2023, 15 pages.
Extended Examination Search Report in counterpart European Application No. 23209496.1, mailed Jan. 18, 2024, 11 pages.
3GPP, "Draft Report of 3GPP TSG RAN WG2 meeting #86," ETSI MCC, Seoul, Republic of Korea, May 19-23, 2014, 167 pages.
Office Action in counterpart Chinese Application No. 202010776679.9, mailed Apr. 19, 2024, 18 pages.
Office Action in counterpart Chinese Application No. 202010776446.9, mailed Apr. 19, 2024, 13 pages.

\* cited by examiner

METHOD AND APPARATUS FOR OPERATING BUFFER STATE REPORT IN WIRELESS COMMUNICATION SYSTEM

CROSS-REFERENCE TO RELATED APPLICATIONS

This application is a continuation of U.S. patent application Ser. No. 17/200,726, filed on Mar. 12, 2021, now U.S. Pat. No. 11,696,357, which is a continuation of U.S. application Ser. No. 16/837,362, filed on Apr. 1, 2020, now U.S. Pat. No. 10,986,687, which is a continuation of U.S. application Ser. No. 16/279,002, filed on Feb. 19, 2019, now U.S. Pat. No. 10,645,747, which is a continuation of U.S. application Ser. No. 14/820,443, filed on Aug. 6, 2015, now U.S. Pat. No. 10,257,878, which claims priority from and the benefit of Korean Patent Application Nos. 10-2014-0102128, filed on Aug. 8, 2014, and 10-2014-0153775, filed on Nov. 6, 2014, all of which are hereby incorporated by reference in their entirety.

BACKGROUND

1. Field the present disclosure relates to wireless communication, and more particularly, to a method and an apparatus for operating a buffer state report when a user equipment performs a device-to-device communication using a resource allocated by a base station in a wireless communication system supporting device-to-device communication.

2. Discussion of the Background

Device-to-device (D2D) communication relates to a communication method having been available since the era of an analog two-way radio and has been used over the very long history. However, D2D communication in a wireless communication system is distinguished from existing D2D communication.

The D2D communication in the wireless communication system indicates communication that uses a transmission and reception technology, for example, a physical channel, of the wireless communication system in a frequency band of the wireless communication system or a band excluding the frequency band, and in this instance, enables user data to be directly transmitted and received between devices, for example, user equipments (UEs) without using an infrastructure, for example, an evolved-NodeB (eNB). That is, two UEs function as a source and a destination of data, respectively, and perform communication. Such a method enables wireless communication to be available in an area outside a limited wireless communication infrastructure and also decreases network load of the wireless communication system. For D2D communication in a wireless communication system, a base station may schedule resources needed for in-coverage UEs to transmit data via D2D communication. To this end, a UE may notify the base station through a buffer state report (BSR) of how much data is in a UE buffer to be transmitted via D2D communication.

In an exception case, a UE may transmit D2D data through a resource that the UE autonomously selects, instead of being allocated by the base station a resource necessary to transmit data via D2D communication. For this case, when an already triggered BSR is present in the UE, it needs to be determined how the UE handles the already triggered BSR before, and there is also a need for a detailed BSR operation and definition of the BSR.

SUMMARY

Exemplary embodiments relate to a method and apparatus for operating a buffer state report for supporting a Device-to-Device (D2D) communication.

Exemplary embodiments also relate to a method and apparatus for determining a resource allocation for a Device-to-Device (D2D) communication.

Exemplary embodiments also relate to a method and apparatus for stopping a buffer state report of a Device-to-Device (D2D) communication with canceling BSR for a D2D data transmission based on a determined RLF condition for system efficiency.

An exemplary embodiment provides a method of supporting a buffer status report (BSR) associated with a device-to-device (D2D) communication, the method including: establishing a radio resource control (RRC) connection with an evolved NodeB (eNB) and receiving configuration information associated with a D2D communication from the eNB, the configuration information including information of a resource allocation mode for a D2D data transmission and information of a timer associated with a BSR for a D2D data transmission; determining, by a user equipment (UE), a radio link failure (RLF), the RLF being associated with a connection problem of the RRC connection; initializing a re-establishment process for the RRC connection; canceling all BSRs for a D2D data transmission in response to the determined RLF, the canceled BSRs for a D2D data transmission being associated with a D2D data transmission scheduled by the eNB; and initializing the timer associated with a BSR for a D2D data transmission.

An exemplary embodiment provides a user equipment to support a buffer status report (BSR) associated with a device-to-device (D2D) communication, the UE including: a wireless transceiver to establish a radio resource control (RRC) connection with an evolved NodeB (eNB) and to receive configuration information associated with a D2D communication from the eNB, the configuration information including information of a resource allocation mode for a D2D data transmission and information of a timer associated with a BSR for a D2D data transmission, and a processor configured to determine a radio link failure (RLF), the RLF being associated with a connection problem of the RRC connection, to initialize a re-establishment process for the RRC connection, to cancel all BSRs for a D2D data transmission in response to the determined RLF, the canceled BSRs for a D2D data transmission being associated with a D2D data transmission scheduled by the eNB, and to initialize the timer associated with a BSR for a D2D data transmission.

An exemplary embodiment provides a method of supporting a buffer status report (BSR) associated with a device-to-device (D2D) communication, the method including: establishing a radio resource control (RRC) connection with an evolved NodeB (eNB) and receiving configuration information associated with a D2D communication from the eNB, the configuration information including information of a resource allocation mode for a D2D data transmission; operating a user equipment (UE) in a first transmission mode for a D2D communication, the first transmission mode corresponding to the resource allocation mode; determining, by the UE, an exceptional case; transitioning from the first transmission mode to a second transmission mode in response to determining the exceptional case, the second transmission mode corresponding to a resource selection mode in which the UE selects a resource for transmitting D2D data from a resource pool; and canceling at least one triggered BSR for a D2D data transmission in response to determining the exceptional case, the canceled BSR for a D2D data transmission being associated with a D2D data transmission scheduled by the eNB.

According to an exemplary embodiment, in D2D communication in a wireless communication system, a UE which allocates a resource for D2D communication or a UE present in a service coverage of a base station may efficiently be allocated a resource for D2D communication.

DETAILED DESCRIPTION OF THE ILLUSTRATED EMBODIMENTS

Figure 1:
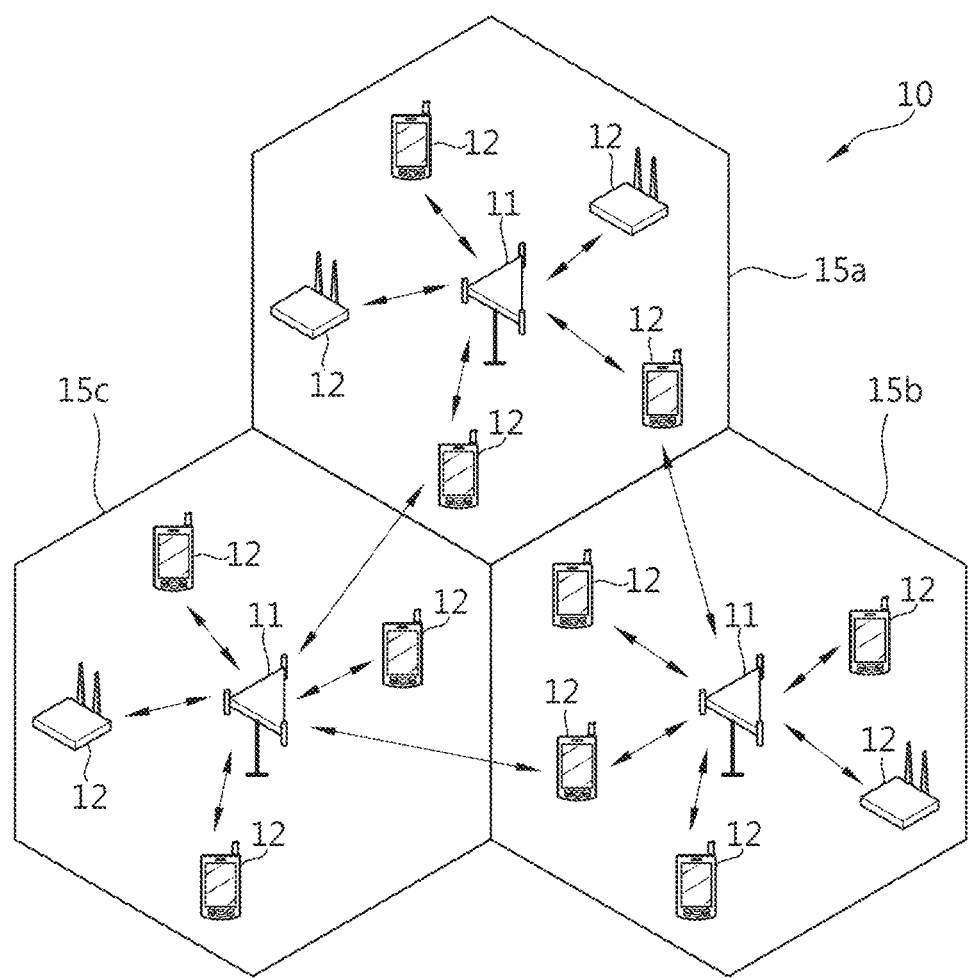
FIG. 1 is a block diagram illustrating a wireless communication system according to an exemplary embodiment.

Exemplary embodiments will be described more fully hereinafter with reference to the accompanying drawings, in which exemplary embodiments of inventive concept are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be sued herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. The present specification provides descriptions in association with a wireless communication network, and tasks executed in the wireless communication network may be performed in the process where a system (for example, a base station) that manages the corresponding wireless communication network controls the network and transmit data, or may be performed in a User Equipment (UE) that is wireless linked to the corresponding network and capable of communicating with the network system.

The present specification provides descriptions in association with a communication network, and tasks executed in the communication network may be performed in the process where a system (for example, a base station) that manages the corresponding communication network controls the network and transmits data, or may be performed in a User Equipment (UE) that is linked to the corresponding network.

FIG. 1 is a diagram illustrating a network architecture of a wireless communication system, according to one or more exemplary embodiments.

Referring to FIG. 1, a wireless communication system 10 may provide a communication service between a Base Station (BS) and a User Equipment (UE). In a wireless communication system, a UE and a BS may wirelessly transmit and receive data. Also, the wireless communication system may support Device-to-Device (D2D) communication between UEs. The wireless communication system that supports that D2D communication will be described later.

A BS 11 of the wireless communication system 10 may provide a communication service to a UE existing in a transmission coverage of the BS 11, through a predetermined frequency band. The coverage within which a BS provides a service is also referred to as a site. The site may include various areas 15a, 15b, and 15c, which may be referred to as sectors. The sectors included in the site may be identified based on different identifier from one another. Each section 15a, 15b, and 15c may be construed as a part of the area that the BS 11 covers.

A base station 11 communicates with User Equipment (UE) 12 and may be referred to as eNB (evolved-NodeB), BTS (Base Transceiver System), Access Point, femto base station, Home nodeB, relay and Remote Radio Head (RRH). User equipment 12 (mobile station, MS) may be located at a certain location or mobile, and may also be referred to as different terms, including UE (user equipment). MT (mobile terminal), UT (user terminal), SS (subscriber station), wireless device, PDA (personal digital assistant), wireless modem, and handheld device. A cell inclusively refers to a various coverage areas, such as a mega cell, macro cell, micro cell, pico cell, and femto cell. A cell may be used as a term for indicating a frequency based that a BS provides, a coverage of a BS, or a BS.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

The layers of a radio interface protocol between a UE and a BS may be classified as a first layer (L1), a second layer (L2), and a third layer (L3), based on three low layers of an Open System interconnection (OSI) model in association with a communication system. A physical layer belonging to the L1 among the layers, provides a information transfer service using a physical channel.

The physical layer is connected to a Media Access Control layer which is a higher layer, through a transport channel. Data is transferred through a transport channel between the MAC layer and the physical layer. The transport channel is classified based on a scheme of transmitting data through a radio interface. In addition, data is transferred through a physical channel between different physical layers (that is, between physical layers of UE and an eNB). The physical channel may be modulated based on an Orthogonal Frequency Division Multiplexing (OFDM) scheme, and uses a space formed of time and frequencies, and a space formed of a plurality of antennas as radio resources.

For example, a Physical Downlink Control CHannel (PDCCH) among physical channels may inform a UE of resource allocation of a Paging CHannel (PCH) and a DownLink Shared CHannel (DL-SCH) and Hybrid Automatic Repeat Request (HARQ) information associated with a DL-SCH, and may deliver, to a UE, uplink scheduling grant which reports resource allocation of uplink transmission. A Physical Control Format Indicator CHannel (PCFICH) informs a UE of the number of OFDM symbols used for PDCCHs, and is transmitted for each subframe. A Physical Hybrid ARQ Indicator CHannel (PHICH) carries a HARQ AC/NACK signal as a response to uplink transmission. In addition, a Physical Uplink Control CHannel (PUCCH) delivers HARQ ACK/NACK with respect to downlink transmission and uplink control information such as a scheduling request and a Channel Quality Indicator (CQI). A physical Uplink Shared CHannel (PUSCH) delivers an UpLink Shared CHannel (UL-SCH). The PUSCH may include HARQ ACK/NACK and Channel State Information (CSI) such as a CQI.

A Data Link Layer, which is the second layer of the OSI model, includes a Radio Link Control (RLC) layer and a Packet Data Convergence Protocol (PDCP) layer.

The MAC layer may execute mapping between a logical channel and a transport channel, and execute multiplexing or demultiplexing between a transport channel of a MAC Service Data Unit (SDU) that belongs to the logical channel and a transport block provided in a physical channel. The MAC layer provides services to a Radio Link Control (RLC) layer through the logical channel. The logical channel is classified into a control channel for transferring control area information and a traffic channel for transferring user area information. For example, services provided from the MAC layer to a higher layer include data transmission or radio resource allocation.

The functions of the RLC layer include concatenation, segmentation, and reassembly of an RLC SDU. The RLC layer provides three types of operation modes, such as, a Transparent Mode (TM), and Unacknowledged Mode (UM) and an Acknowledged Mode (AM), to secure various Quality of Services (QoS) required by a Radio Bearer (RB).

The function of a Packet Data Convergence Protocol (PDCP) layer in the user plane includes user data transmission, header compression, and ciphering, and control plane data transmission and ciphering/integrity protection.

An RRC layer controls a logical channel, a transport channel, and a physical channel, in association with configuration, reconfiguration, and release of RBs. An RB indicates a logical path provided by a first layer (PHY layer) and a second layer (MAC layer, RLC layer, and PDCP layer), for transferring data between a UE and a network. A process of configuring an RB indicates a process that defines properties of radio protocol layer and a channel for providing a predetermined service, and sets corresponding detailed parameters and an operation method. An RB may be classified into a Signaling RB (SRB) and a Data RB (DRB). The SRB is used as a path for transmitting an RRC message and a Non-Access Stratum (NAS) message in the control plane, and the DRB is used as a path for transmitting user data in the user plane. Hereinafter, the terms "SRB" and "DRB"0 are collectively referred to as the term "RB," which is to mean a DRB.

Figure 2:
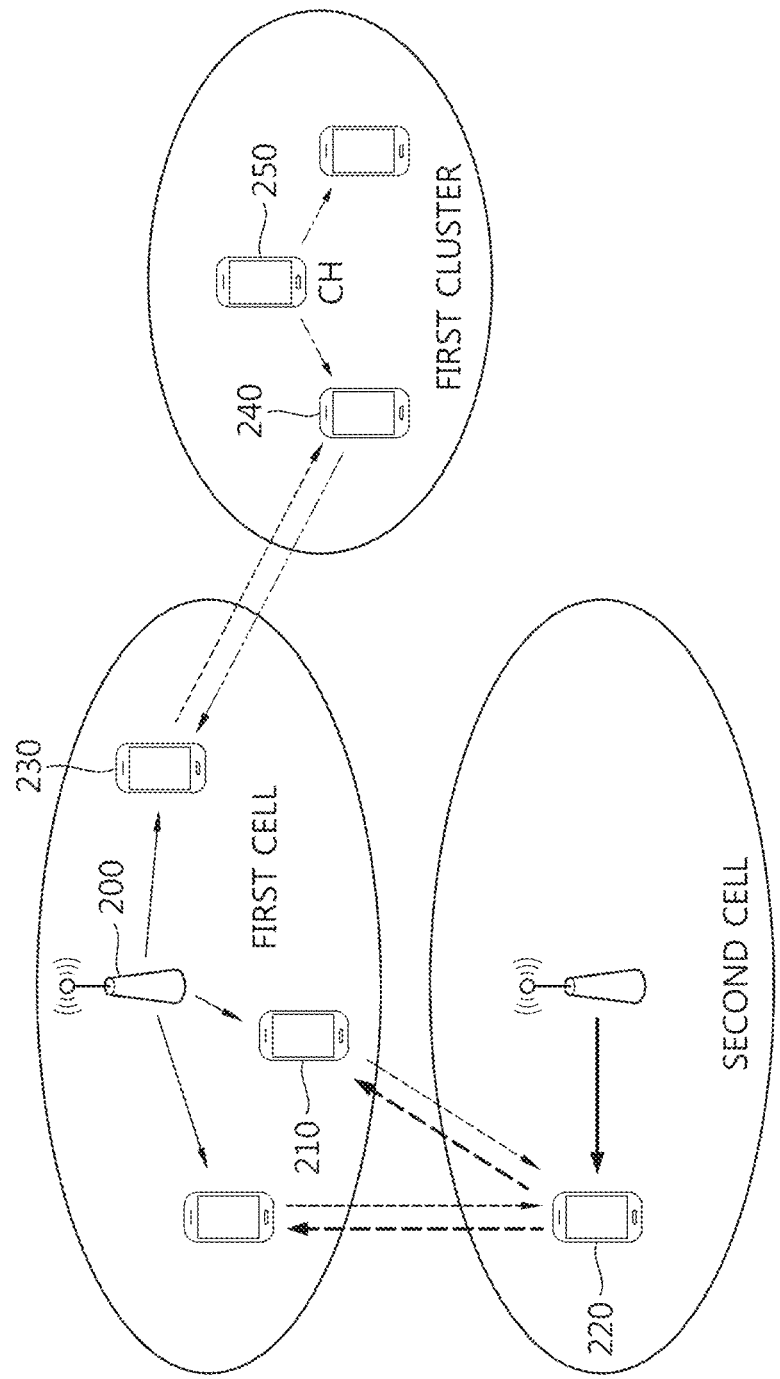
FIG. 2 schematically illustrates a concept of D2D communication based on a cellular network according to an exemplary embodiment.

FIG. 2 illustrates the concept of cellular network-based D2D communication applied according to an exemplary embodiment.

D2D communication refers to a technology which enables direct transmission and reception of data between UEs. Hereinafter, it is assumed that a UE supports D2D communication in an exemplary embodiment. The term "D2D" may be replaced with the expression "proximity-based service (ProSe)" or "ProSe-D2D." The term "ProSe" is used for D2D to mean that a proximity-based service may be added to the technology which enables direct transmission and reception of data between UEs, without changing the meaning of the technology.

Recently, methods for carrying out discovery and direct communication between in-coverage or out-of-coverage devices in a network have been studied for the purpose of public safety, etc. A UE performing D2D communication may be referred as a D2D UE. Further, a UE transmitting a signal based on a D2D communication may be referred to as a transmitting (Tx) UE, and a UE receiving a signal based on a D2D communication may be referred as a receiving (Rx) UE. A Tx UE may transmit a discovery signal, and an Rx UE may receive the discovery signal. A Tx UE and an Rx UE may exchange their roles therebetween. Further, a signal transmitted by a Tx UE can be received by two or more Rx UEs.

The load at a base station can be distributed and reduced if adjacent UEs perform D2D communications in a cellular system. Also, when adjacent UEs carry out D2D communications, UE's transmission power consumption and transmission latency may be reduced because UEs send data to a target located within a relatively short distance. Moreover, from the perspective the whole system, frequency utilization effectiveness is enhanced because existing cellular-based communication and D2D communication use the same resources.

D2D communication may be classified into a communication method of in-coverage UE, which is located in network coverage (base station coverage) and a communication method of out-of-coverage UE, which is located out of network coverage.

Referring to FIG. 2, the communication between a first UE 210 located in a first cell and a second UE 220 located in a second cell and the communication between a third UE 230 located in a first cell and a fourth UE 240 located in a first cluster may be D2D communication between UEs in a network coverage. The communication between the fourth UE 240 located in the first cluster and a fifth UE 250 located in the first cluster may be D2D communication between the UEs located outside a network coverage. The fifth UE 350 is the cluster header, and the cluster header may operate as an independent Synchronization Source (ISS) for synchronization of an out-of-coverage UE.

The D2D communication may include a discovery process that executes discovery for communication between UEs and a direct communication process in which UEs transmit and receive control data and/or traffic data. The D2D communication may be used for various purposes. For example, D2D communication within a network coverage and D2D communication outside a network coverage may be used for public safety. The D2D communication outside a network coverage may be used for only the public safety. D2D communication in a BS coverage may be executed based on a BS.

For example, a BS 200 may transmit D2D resource allocation information to the first UE 210 located in the BS coverage. The D2D resource allocation information may include allocation information associated with a D2D communication resource for D2D communication between the first UE 210 and another UE (for example, a second UE 220).

The first UE 210 that receives the D2D resource allocation information from the BS, may transmit the D2D resource allocation information to the second UE 220 outside the BS coverage. The second UE 220 may be a UE located outside the BS coverage, from the perspective of the BS 200 of a first cell. The first UE 210 and the second UE 220 may execute D2D communication based on the D2D resource allocation information. Particularly, the second UE 220 may obtain information associated with the D2D communication resource of the first UE 210. The second UE 220 may receive traffic data and/or control data transmitted from the first UE 210, through a resource indicated by the information associated with the D2D communication resource of the first UE 210.

In the D2D communication, a UE may transmit control data to another UE. A separate channel (for example, a Physical Uplink Control Channel (PUCCH)) for transmitting control data may not be defined in the D2D communication. When the control channel is not defined in the D2D communication, a UE may use various methods for transmitting control data for D2D communication.

Here, in D2D communication, physical layer control data for synchronization includes information transmitted via a synchronization channel, for example, a physical D2D synchronization channel (PD2DSCH). The physical layer control data for data communication includes Scheduling Assignment (SA) information and may be provided via a channel having a format similar to or the same as a PUSCH format for D2D communication. In D2D communication, practical traffic data distinguished from the physical layer control data may be expressed as the term "D2D data."

Additionally, a method for transmitting upper layer control data other than the physical layer control data in D2D communication may be defined.

In a D2D communication, a UE may operate in a first transmission mode and a second transmission mode. The first transmission mode is a mode in which the UE is capable of carrying out D2D communication only when the UE has been assigned resources for a D2D communication from a base station, where a base station sends a D2D grant to a transmitting UE, which transmits a D2D signal to another UE. The D2D grant provides the transmitting UE with parameter information that needs to be decided by a base station among pieces of Scheduling Assignment (SA) information that needs to be obtained at a receiving UE for D2D data reception in a D2D communication, resource allocation information for the SA, and resource allocation information for data indicated by the SA. The parameter information that needs to be decided by the base station includes resource allocation information for data indicated by the SA. The D2D grant is forwarded to a transmitting UE in Downlink Control Information (DCI), and may be carried in Physical Downlink Control Channel (PDCCH) or Enhanced PDCCH (EPDCCH). The D2D grant may be control information with its distinct D2D purpose indicated by uplink grant or D2D-RNTI assigned to each UE. The D2D grant may be referred to as SA/data grant.

Meanwhile, the second transmission mode is a mode which enables the UE to perform D2D communication regardless of an instruction from the BS, in which the UE may autonomously select a resource for use among available radio resources for D2D communication to transmit D2D data. When information indicating that a particular cell in the BS is capable of supporting D2D through a System Information Block (SIB)/dedicated signaling and D2D resource pool information for the second transmission mode provided from the BS are present, the UE is allowed to operate in the second transmission mode only for the particular cell. However, the BS does not allow an operation in the second transmission mode, that is, when the information indicating that the particular cell in the BS is capable of supporting D2D is present but the D2D resource pool information for the second transmission mode is not provided from the BS, the UE is not allowed to operate in the second transmission mode. Further, when the D2D resource pool information for the second mode is valid only in the RRC connected mode, a UE in the RRC idle mode is not allowed to operate in the second transmission mode even the presence of the D2D resource pool information for the second transmission mode. Here, when a UE is positioned out of a network service area, that is, when the UE is in an 'Any Cell Selection' mode in which the UE is in the RRC idle mode but selects no service-enabled cell, the UE may operate in the second transmission mode using the D2D resource pool information for the second transmission mode stored in an Universal Subscriber Identity Module (USIM) Integrated Circuit Card (UICC) of the UE or the D2D resource pool information for the second transmission mode received from the BS in a service area of a previous network.

In the wireless communication system, the UE reports a status of a buffer thereof to the BS in order to allocate a resource needed to transmit uplink (UL) data (data to be transmitted to the BS) present in the buffer of the UE, and the BS schedules a resource to be allocate to each UE based on the information on the status of the buffer reported by the UE.

Thus, in supporting D2D communication according to an exemplary embodiment, the BS may need to schedule resources necessary for in-coverage UEs to transmit data via D2D communication. To this end, the BS may need to know how much data to be transmitted via D2D communication (hereinafter, referred to as "D2D data") is in a UE buffer. Accordingly, there is suggested a method of a UE notifying the BS of how much data is in a UE buffer to be transmitted via D2D communication.

To this end, the wireless communication system according to an exemplary embodiment supports a form that a UE reports to the BS a buffer status regarding UL data (data to be transmitted to the BS) through a BSR and provides a form and criteria for reporting a buffer status regarding D2D data for efficient scheduling of resources needed to transmit D2D data.

Figure 3:
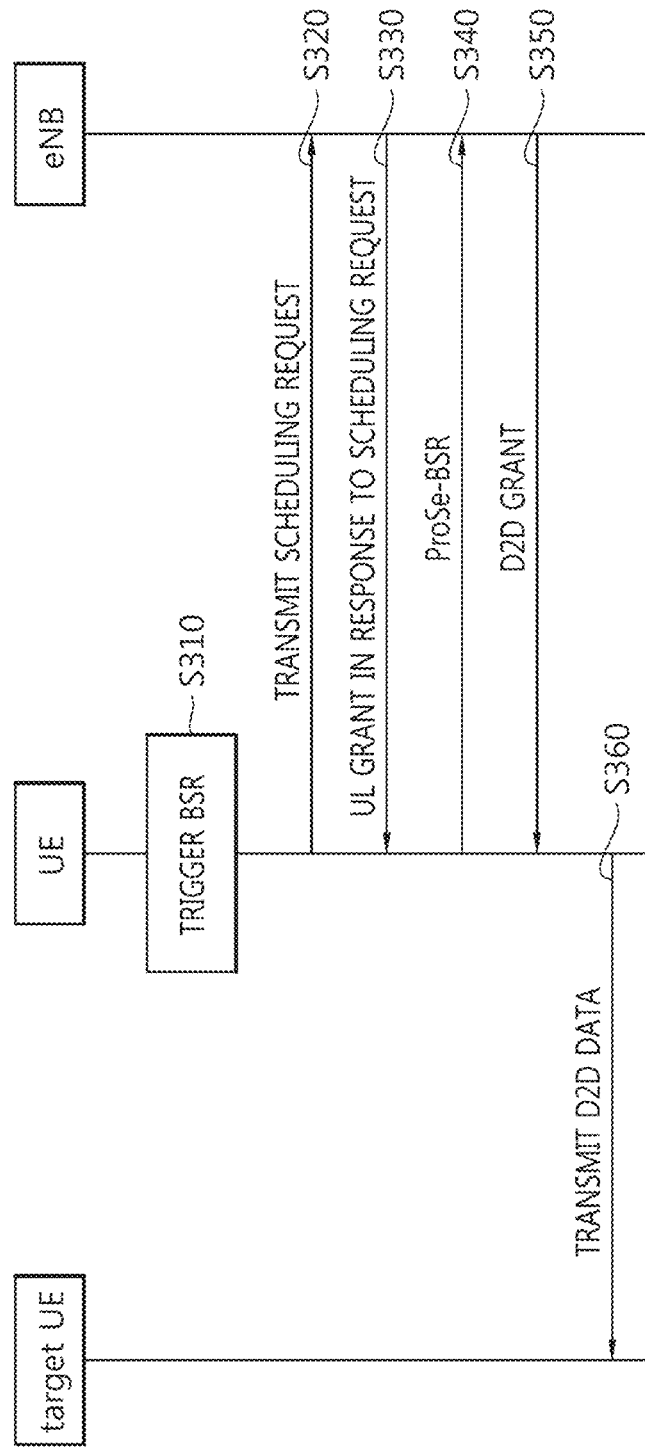
FIG. 3 illustrates a process of transmitting ProSe-BSR according to an exemplary embodiment.

FIG. 3 illustrates a process that a UE transmits a ProSe-BSR to the BS in order to transmit D2D data in the first transmission mode in the wireless communication system according to an exemplary embodiment.

When a UE capable of performing D2D communication in the wireless communication system has data to transmit via a D2D link in a DRB configured for D2D, a BSR on the D2D data is triggered in operation S310. According to an exemplary embodiment, a BSR on D2D data is referred to as a ProSe-BSR hereinafter. The ProSe-BSR refers to a BSR for D2D communication, which is distinguished from a BSR defined and used for the current wireless communication system.

When the ProSe-BSR is triggered, the UE transmits a scheduling request (SR) to the BS in order to induce allocation of a resource for transmission of the D2D data and ProSe-BSR in operation S320 and receives an UL grant in response to the SR from the BS in operation S330. Here, the SR is transmitted to the BS via a PUCCH. As the SR, an SR used in a conventional wireless communication system may be used, or a resource additionally allocated by the BS as an SR for D2D purposes, which is distinguished from the SR, may be used. When the SR for D2D purposes is distinguished by definition from the conventional SR, the SR may be distinguished as an ProSe-BSR. For convenience of description, an SR and a ProSe-BSR are collectively referred to as an SR.

When the SR is triggered, the SR is pending until the SR is cancelled. On the contrary, when the UL grant does not accommodate all pending data for transmission or a Media Access Control Protocol Data Unit (MAC PUD) is configured and includes a ProSe-BSR formed in such a buffer status that up to a last occurring event is included, the UE cancels all pending SRs and stops a timer (sr-ProhibitTimer) not to transmit the SRs.

In detail, when the SR is triggered and there is no currently pending SR, the UE sets an SR counter (SR_COUNTER) value to 0. However, in a case where the SR is pending, there is a valid PUCCH resource for sending the SR in a current Transmission Time Interval (TTI), the current TTI is not part of a measurement gap, and the sr-ProhibitTimer is not running, when the SR_COUNTER value is smaller than the maximum number SR transmission times, the UE increases the SR counter value by 1, directs the physical layer to transmit an SR signal through the PUCCH, and starts the sr-ProhibitTimer. However, when the SR_COUNTER value is equal to or greater than the maximum number of transmission times, the UE notifies the RRC of release of the PUCCH and SRS and clears all configured DL allocations and UL grants. Then, the UE initializes a random access procedure and cancels all pending SRs.

Meanwhile, when the SR is pending but there is no available UL-SCH resource for transmission in any TTI, the UE initializes the random access procedure and cancels all pending SRs. Thus, the ProSe-BSR may be transmitted to the BS through the random access procedure.

When the UL grant in response to the SR is received, the UE transmits the ProSe-BSE to the BS in operation S340. When a D2D grant in response to the ProSe-BSR is received from the BS in operation S350, the UE transmits data to a destination UE using a resource allocated for transmission of the D2D data in operation S360. As described above, the ProSe-BSR is for the UE to notify the serving BS of information on the amount of data to be transmitted present in the D2D link buffer. According to an exemplary embodiment, for example, the ProSe-BSR procedure is performed after the SR is transmitted. However, when the UE receives a sufficient UL grant to transmit the ProSe-BSR before transmission of the SR, the ProSe-BSR may be transmitted before transmission of the SR.

The BS configures a periodic BSR timer (periodicBSR-Timer) and a retransmission BSR timer (retxBSR-Timer) for the ProSe-BSR through a signaling defined in the RRC layer to control the ProSe-BSR procedure with respect to a logical channel in each UE. For each UE, a Logical Channel Group (LCG) May be optionally configured by an RRC signal by an eNB, and the ProSe-BSR may be performed for an LCG including a logical channel for D2D communication (hereinafter, "LCG"). The LCG is set separately from an LCG that is a destination of a BSR for the wireless communication system. For instance, an LCG for a ProSe-BSR and an LCG for a conventional BSR are set separately.

Here, the LCG as the destination of the BSR for the wireless communication system are formed of only logical channels (DCCH and DTCH) set for data transmission in the wireless communication system, and the logical channels (LCs) may have indexes of 0 to 11. On the contrary, the LCG as the destination of the BSR for D2D communication are formed of only LCs (PTCHs) set for D2D data transmission, and the LCs for D2D communication may have indexes of 0 to 11 independently of the indexes of the LCs for the wireless communication system (0 to 11).

Additionally, the BS may set the periodic timer/retransmission time for the ProSe-BSR through an RRC with respect to each UE separately from a BSR for the wireless communication system.

A UE configures a ProSe-BSR based on pieces of buffered data in each LCG in each UE. Up to four LCGs may be configured in a UE. As a ProSe-BSR format, there may be a short BSR for reporting a buffer status corresponding to one LCG, a long BSR for reporting a buffer status corresponding to four LCGs, or a truncated BSR. A BSR format will be described later.

For the ProSe-BSR procedure, a UE may consider a suspended Radio Bearer (RB) as a ProSe-BSR destination and necessarily considers all unsuspended RBs as ProSe-BSR destinations. ProSe-BSRs may be divided into a regular ProSe-BSR, a padding ProSe-BSR, and a periodic ProSe-BSR.

The regular ProSe-BSR is triggered when data transmittable to a logical channel included in an LLG is present in an RLC entity or PDCP entity and there is UL data transmittable to a logical channel having a higher priority than other logical channels already including transmittable data. Further, the regular ProSe-BSR is also triggered when a retxBSR-Timer for a ProSe-BSR expires and a UE includes transmittable data in a logical channel of an LCG.

The padding ProSe-BSR is triggered when the number or padding bits remaining after allocation of a UL resource and a resource for padding BSR transmission for the wireless communication system is equal to or greater than a size for ProSe-BSR transmission.

Alternatively, the padding ProSe-BSR is triggered when the number or padding bits remaining after allocation of a UL resource and a resource for BR transmission for the wireless communication system is equal to or greater than the size for ProSe-BSR transmission.

The periodic ProSe-BSR is triggered when a periodic BSR-Timer for the ProSe-BSR expires.

The regular ProSe-BSR and the periodic ProSe-BSR are transmitted in a long ProSe-BSR format when more than one LCG (at least two or more LCGs) have data to transmit in a TTI in which the ProSe-BSRs are transmitted. Otherwise (when only one LCG has data to transmit), the regular ProSe-BSR and the periodic ProSe-BSR may be configured and transmitted in a short BSR format. The padding ProSe-BSR is configured and transmitted in a truncated ProSe-BSR format with respect to an LCG including a logical channel having a top priority in data transmission when the number of padding bits included in an MAC PDU is equal to or greater than the total size of a short ProSe-BSR and a sub-header of the short ProSe-BSR but is smaller than the total size of a long ProSe-BSR and a sub-header of the long ProSe-BSR and more than one LCG has data to transmit in an TTI in which the padding ProSe-BSR is transmitted. In other cases, the padding ProSe-BSR is transmitted in a short ProSe-BSR format. Alternatively, when only a short ProSe- BSR format is possible as a ProSe-BSR format, the padding ProSe-BSR may always be transmitted in the short ProSe-BSR format.

Meanwhile, the padding ProSe-BSR is transmitted in a long ProSe-BSR format when the number of padding bits is equal to or greater than the total size of a long ProSe-BSR and a sub-header of the long ProSe-BSR. Alternatively, only a short ProSe-BSR format is possible as a ProSe-BSR format, the padding ProSe-BSR is always transmitted in the short ProSe-BSR.

Meanwhile, a UE performs the ProSe-BSR procedure when at least one ProSe-BSR is triggered and is not cancelled. When an UL resource for new transmission is allocated in a current TTI, the UE instructs multiplexing and assembly procedures for generation of a ProSe-BSR MAC control element, starts or restarts the periodic ProSe-BSR-timer for the ProSe-BSR, and starts or restarts the retxBSR-Timer for the ProSe-BSR. Here, a procedure of starting or restarting the periodicBSR-Timer for the ProSe-BSR is excluded when a truncated ProSe-BSR is generated. When the UL resource for new transmission is not allocated in the current TTI, a regular ProSe-BSR is triggered.

Here, one MAC PDU includes only one ProSe-BSR MAC control element even when a plurality of ProSe-BSRs is triggered. Also, when it is possible to transmit a regular ProSe-BSR or periodic ProSe-BSR, the regular ProSe-BSR or periodic ProSe-BSR is always a priority over the padding ProSe-BSR. Also, when reception of an indication which instructs transmission of new data with respect to all UL-SCHs is verified, the UE restarts the retxBSR-Timer. All triggered ProSe-BSRs need to be cancelled when the ProSe-BSR are included in the MAC PDU.

The UE transmits one regular or periodic ProSe-BSR in one TTI. Also, according to an exemplary embodiment, the ProSe-BSR may be transmitted in the same TTI as a BSR of the wireless communication system. For example, in the same sub-frame (TTI), a ProSe-BSR for a D2D service and a conventional BSR for a general data service may be simultaneously transmitted. Here, information on the BRSs may be distinguished through LCIDs.

When the UE receives a request for transmission of a plurality of MAC PDUs in one TTI, one padding ProSe-BSR may be included in random MAC PDUs not including a regular or periodic ProSe-BSR. Thus, one padding ProSe-BSR may be included in random MAC PDUs including a regular or periodic ProSe-BSR for the wireless communication system. That is, although a padding BSR has a priority over a padding ProSe-BSR, the padding ProSe-BSR may be included first merely in a random MAC PDU including a regular or periodic BSR. The padding ProSe-BSR may also be included when a request for transmission of a single MAC PDU in one TTI is received. All ProSe-BSRs always reflect a buffer status after the UE configures MAC PDUs to transmit based on a previously received D2D grant on the basis of a TTI in which the ProSe-BSR is transmitted. Each LCG reports one buffer status value in each TTI, and the buffer status value is reported through a ProSe-BSR with respect to the LCG in all ProSe-BSRs. That is, the same TTI, one ProSe-BSR value is transmitted by each LCG, and the buffer status with respect to the LCG value is the same in all ProSe-BSRs transmitted in the same TTI. Meanwhile, the padding ProSe-BSR is not allowed to cancel the regular or periodic ProSe-BSR. The padding ProSe-BSR is triggered with respect to a particular MAC PDU, and is cancelled when the particular MAC PDU is generated.

However, in a wireless communication system, all triggered BSRs are canceled when an uplink (UL) grant is received which indicates that it is possible to send all pending data but impossible to additionally send a BSR MAC control element. Further, all triggered BSRs are canceled when the BSRs are included in an MAC PDU. That is, in the wireless communication, a triggered BSR may be canceled only in the following circumstances.

1. When a sub-frame is capable of accommodating all data to be transmitted via an uplink using a resource secured through an UL grant but is incapable of including a BSR MAC CE including an MAC sub-header.

In this case, a UE cancels a triggered BSR and transmits all data to be transmitted through the uplink via the uplink.

2. When a BSR is included in an MAC PDU for uplink transmission.

As described above, in D2D communication, a base station (BS) may need to schedule resources needed for in-coverage UEs to transmit data via D2D communication. To this end, a UE may notify the BS through a BSR of how much data to be transmitted via D2D communication (hereinafter, referred to as "D2D data") is in a UE buffer. However, in an exceptional case (for example, when a UE is incapable of maintaining an RRC connection with a BS), the UE may need to transmit D2D data through a resource that the UE autonomously selects, instead of being allocated by the BS a resource necessary to transmit data via D2D communication. To this end, a first transmission mode (Transmission Mode 1) and a second transmission mode (Transmission Mode 2) may be supported in D2D communication.

However, when the UE is set to or operates in the second transmission mode, a resource for D2D transmission may not be controlled by a BS. Thus, the BS may need to reserve the resource for D2D transmission. The reserved resource may be determined based on the number of UEs capable of operating in the second transmission mode and the estimated resource consumption of each UE.

If a greater amount of resources are reserved for the second transmission mode, due to a limit to the overall amount of resources, the amount of resources available for normal wireless communication (for example, LTE communication) decreases, which may affect the overall transfer rate of the system. Thus, the BS may reduce the number of UEs capable of operating in the second transmission mode in order to decrease the amount of resources reserved for the second transmission mode. To support a decrease in the number of UEs capable of operating in the second transmission mode, the BS may allow a UE to operate in the second transmission mode only in an exceptional case.

For this, in a case where a D2D transmission mode set for a UE is changed from the first transmission mode to the second transmission mode or a UE set to the first transmission mode operates in the second transmission mode, when there is an already triggered BSR, it needs to be determined how to operate the triggered BSR.

FIGS. 4 to 8 are flowcharts illustrating a method for operating a BSR for D2D communication by a UE according to an exemplary embodiment. Hereinafter, in a case where a D2D transmission mode set for a UE is changed from the first transmission mode to the second transmission mode or a UE set to the first transmission mode operates in the second transmission mode, a method for operating a triggered BSR will be described with reference to FIGS. 4 to 8.

A UE supporting D2D communication may perform D2D communication when a UE user sets up the UE to be ready for D2D communication through a user interface (UI).

Alternatively, a network (for example, a D2D server managing a ProSe Identifier (ID) and a ProSe Application ID of a UE using D2D communication, a serving BS of the UE, or the like) may ultimately determine D2D communication of the UE set up by the UE user to be ready for D2D communication. That is, although the UE is set up by the UE user to be ready for D2D communication, the UE may perform D2D communication only when the network allows the UE to perform D2D communication. Information on availability of D2D communication may be displayed on a screen of the UE.

A resource for D2D communication may be allocated by a UE serving to allocate a resource for D2D communication in D2D communication (hereinafter, cluster head) of by a BS. In this case, a UE needs to report a BSR on D2D data to the BS or the cluster head when D2D communication is performed. For convenience of description, the BS and the cluster header are collectively referred to as a BS hereinafter. Also, a BSR on D2D data is referred to as a ProSe-BSR.

Figure 4:
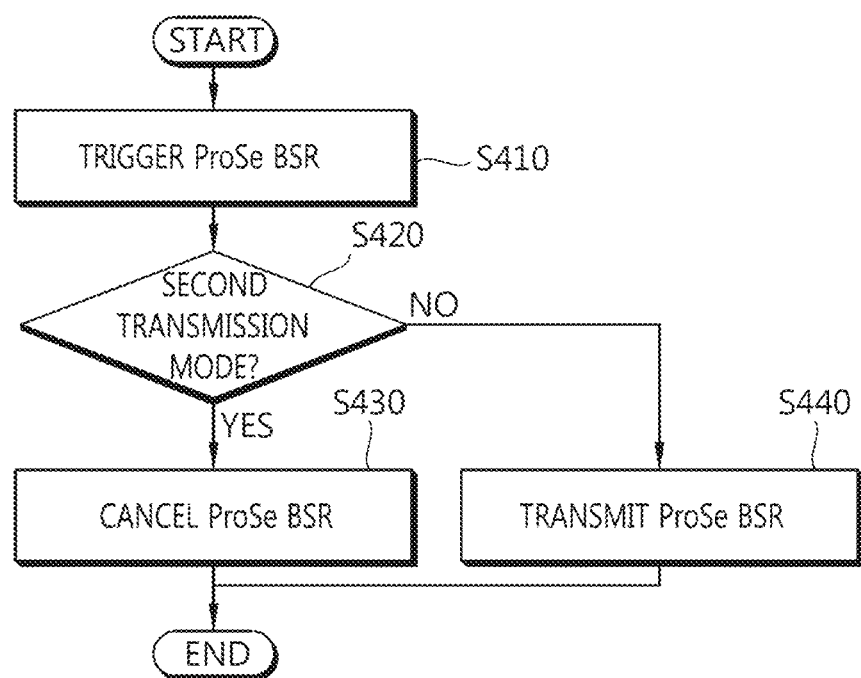
FIGS. 4 to 8 are flowcharts illustrating a method for operating a buffer state report for D2D communication by a UE according to an exemplary embodiment.

In one embodiment with reference to FIG. 4, a ProSe-BSR can be triggered by the same triggering events as that of a BSR for uplink data in operation S410. Hereinafter, the BSR shall be triggered if any of the following events occur.

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus is subheader, in which case the BSR is referred below to as "Padding BSR";

retxBSR-Timer expires and the MAC entity has data available for transmission for any of the logical channels which belong to a LCG, in which case the BSR is referred below to as "Regular BSR";

periodic BSR-Timer expires, in which case the BSR is referred below to as "Periodic BSR".

For this, a different LCID of the ProSe-BSR may be used from that of the BSR for the conventional uplink data. For instance, the ProSe-BSR may be allocated a new LCID to distinguish a short ProSe-BSR, a truncated ProSe-BSR, and a long ProSe-BSR. Alternatively, one ProSe-BSR format may be used as BSR on D2D data and a new LCID representing the format may be used.

When the ProSe-BSR is triggered, a UE may determine whether a current D2D transmission mode of the UE is the second transmission mode in operation S420. When the D2D transmission mode is the second transmission, the UE may cancel the triggered ProSe-BSR in operation S430. When the D2D transmission mode is not the second transmission mode, the UE may transmit a ProSe-BSR MAC CE to the BS as included in an MAC PDU when an uplink resource is allocated based on the triggered ProSe-BSR in operation S440.

For example, when the UE changes the D2D transmission mode thereof from the first transmission mode to the second transmission mode due to the exceptional case according to an exemplary embodiment (a timer relating to an RRC re-establishment procedure and/or a timer relating to handover is running or started) or a case where the BS allows the UE to change the D2D transmission mode to the second transmission mode, the UE may cancel all ProSe-BSRs triggered for an operation in the first transmission mode. Here, the first transmission mode may refer to a mode in which a UE performs D2D communication using a resource allocation scheduled by the BS, and the second transmission mode may refer to a mode in which a UE performs D2D communication using second transmission mode resource pool information for D2D communication. That is, all triggered ProSe-BSRs may be cancelled when the D2D communication mode of the UE is changed from the first transmission mode to the second transmission mode due to the exceptional case and when the UE or BS changes the D2D communication mode from the first transmission mode to the second transmission.

A UE operating in the first transmission mode and a UE operating in a second transmission mode need to verify D2D resource pool information below include in reception resource pool information commRxPool and normal common transmission resource pool information commTxPool-NormalCommon in order to receive D2D data. Here, the reception resource pool information is information indicating resources allowed for reception by D2D UEs operating in RRC idle and connected modes, and the normal common transmission pool information is information indicating resources allowed for transmission by a D2D UE operating in the RRC idle mode.

SA resource pool information

Data resource pool information (included in the normal common transmission resource pool but not included in a resource pool for the first transmission mode among reception resource pool configuration information)

TDD configuration information (included in the reception resource pool information only in the case of a neighbor cell and a TDD operation)

In addition, transmission resource pool information commTxPoolExceptional for an exceptional case, defined separately from the foregoing resource pool information, may be defined for the exceptional case.

The all resource pool information may be transmitted to all UEs in a corresponding cell through a broadcast channel, and a UE intended to perform a D2D communication operation needs to perform a monitoring operation for receiving D2D data that the UE desires to receive through radio resources based on all pieces of the resource pool information. The reception resource pool information may include transmission resource pool information dedicated by the BS to a UE operating in the RRC connected mode in the cell for a transmission operation in the first transmission mode or second transmission mode. The dedicated transmission resource pool information for the first transmission mode or second transmission mode needs to be set up such that physical resources in respective cells do not collide with each other in order to avoid mutual interference. Also, when resources allocated for ProSe communication are insufficient so that collisions between resources occur, BSs need to cooperate with each other so that characteristics, such as cyclic prefix length, of transmission signals set up for the respective cells are the same as each other to limit a mutual interference rage to the same resource range.

Here, the time relating to the RRC re-establishment procedure may be T311 timer, the timer relating to the handover may be a T304 timer, and the respective timers may be defined as in Tables 1 and 2.

TABLE 1

| Timer | Start | Stop | At expiry |
|---|---|---|---|
| T311 | Upon initiating the RRC connection re-establishment procedure | Selection of a suitable E-UTRA cell or a cell using another RAT. | Enter RRC_IDLE |

TABLE 2

| Timer | Start | Stop | At expiry |
|---|---|---|---|
| T304 | Reception of RRCConnectionReconfiguration message including the MobilityControl Info or reception of MobilityFromEUTRACommand message including CellChangeOrder | Criterion for successful completion of handover within E-UTRA. handover to E-UTRA or cell change order is met the criterion is specified in the target RAT in case of inter-RAT) | In case of cell change order from E-UTRA or intra E-UTRA handover, initiate the RRC connection re-establishment procedure; In case of handover to E-UTRA, perform the actions defined in the specifications applicable for the source RAT. |

Referring to Table 1, the T311 timer is started when an RRC connection re-establishment procedure is initiated. The T311 timer is stopped when a suitable Evolved UMTS Terrestrial Radio Access (E-UTRA) cell is selected or a cell using another Radio Access Technology (RAT) is selected. The T311 timer expires when going to an RRC idle state.

Herein, the UE shall initiate the RRC connection re-establishment procedure, upon detecting radio link failure (RLF). According to the initiation of the RRC connection re-establishment procedure, the UE shall start timer T311. Also the UE shall stop time T311 when the UE selects a suitable E-UTRA cell for the RRC connection re-establishment.

Referring to Table 2, the T304 timer is started when an RRC connection reconfiguration message including mobility control information is received or a message including cell change order, MobilityFromEUTRACommand message, is received. Here, the RRC connection reconfiguration message including mobility control information may also be referred to as a handover command message. That is, the T304 timer is started during handover in an LTE network or inter-RAT handover to an LTE system and is stopped when the handover is successfully completed.

Meanwhile, the UE may reset a periodic BSR timer (periodic ProSe BSR-timer) and a retransmission BSR timer (retx ProSe BSR-timer) configured for a ProSe-BSR when the ProSe-BSR is cancelled. The reset periodic BSR timer and retransmission BSR timer configured for the ProSe-BSR may be set to a start state when the D2D transmission mode of the UE is changed from the second transmission mode to the first transmission mode. Herein, the 'reset' for the periodic BSR timer and the retransmission BSR timer of the ProSe-BSR refers to stop and go to zero of a timer value on the periodic BSR timer and the retransmission BSR timer of the ProSe-BSR. That is, it is same operation that the periodic BSR timer and the retransmission BSR timer of the ProSe-BSR shall be stopped and start or restart from 0 timer point on the periodic BSR timer and the retransmission BSR timer of the ProSe-BSR.

Figure 5:
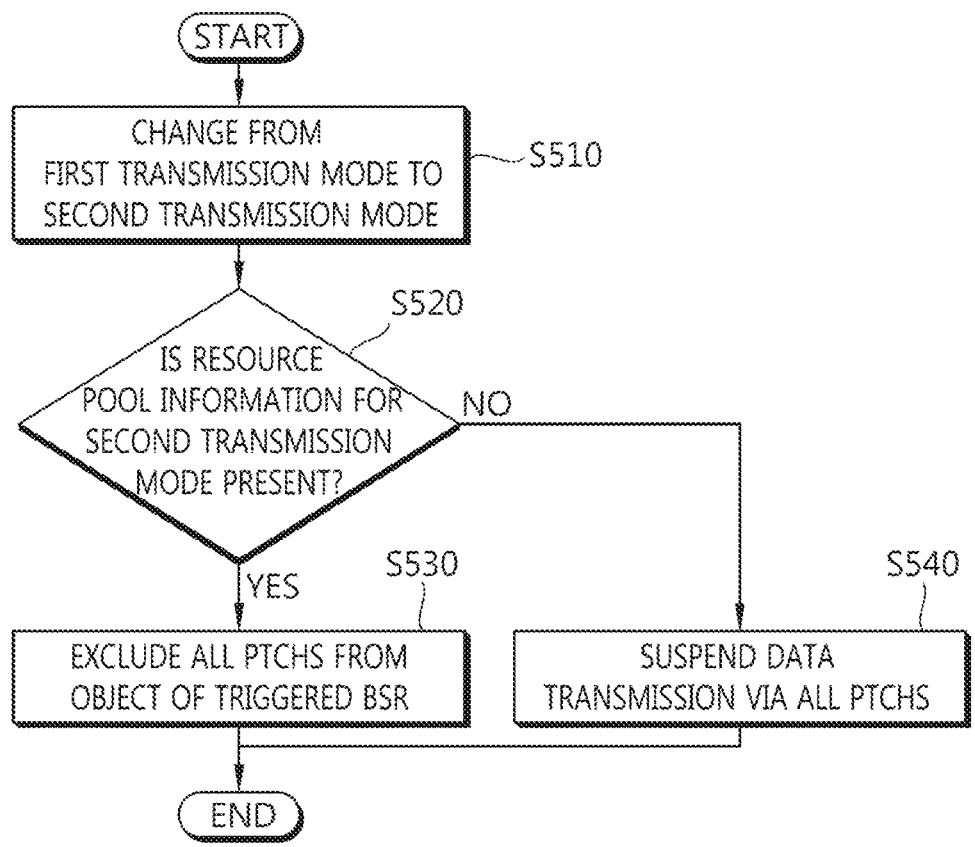

Further, as illustrated in FIG. 5, when the UE changes the D2D transmission mode of the UE from the second transmission mode to the first transmission mode in operation S510, the UE may determine whether resource pool information for the second transmission mode is present in operation S520. Here, when the D2D transmission of the UE is changed due to the exceptional case, the D2D transmission mode may be changed from the first transmission mode to a fallback mode in operation S520. Although the fallback mode is defined as the same D2D UE operation as the second transmission mode, resource pool information for the fallback mode may be transmission resource pool information commTxPoolExceptional for an exceptional case, which is defined for the exceptional case separately from the resource pool information. Thus, when the D2D transmission mode of the UE is changed from the first transmission mode to the fallback mode, it may be further determined whether the resource pool information for the fallback mode is present in operation S520. Here, resource pool information preferentially applied in the fallback mode may be the normal common transmission resource pool information or the transmission resource pool information for the exceptional case with transmission resource pool information of commTxPoolExceptional. When at least one of the two pieces of resource pool information is present, the UE may exclude all logical channels (ProSe Communication Traffic Channels (PTCHs)) configured for D2D communication between UEs from an object of a triggered ProSe-BSR so that a ProSe-BSR is no longer triggered in operation S530. However, when neither of the two pieces of resource pool information are present, the UE is incapable of operating in the second transmission mode and thus may suspend data transmission via the PTCHs in operation S540.

Figure 6:
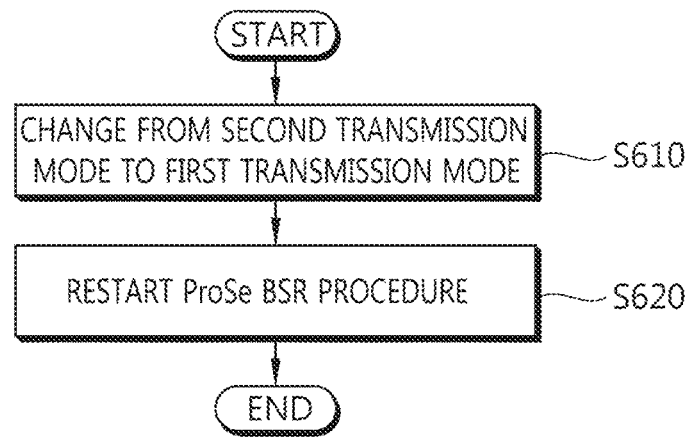

Subsequently, as shown in FIG. 6, when the exceptional case is released (for example, the timer relating to the RRC re-establishment procedure and/or the timer relating to the handover is stopped) so that the D2D transmission of the UE is changed from the second transmission mode to the first transmission mode in operation S610, the UE may start the reset periodic BSR time and retransmission BSR timer and transmit a BSR on data to be transmitted via D2D communication. That is, the UE may restart a normal ProSe-BSR procedure in operation S620.

In a case of handover, when the UE prepares handover so as to change to and operate in the first transmission mode immediately after handover to a target BS is completed (immediately after the T304 timer is stopped), that is, when a source BS transmits a handover request message including UE information including ProSe configuration information, such as the current transmission mode of the UE, to the target BS and the target BS transmits a handover permission message to the source BS in response to the handover request message, ProSe configuration information necessary for an operation in the first transmission mode is included at transmission. The configuration information may include D2D-RNTI information, ProSe-BSR related configuration information, and SA pool information.

Figure 7:
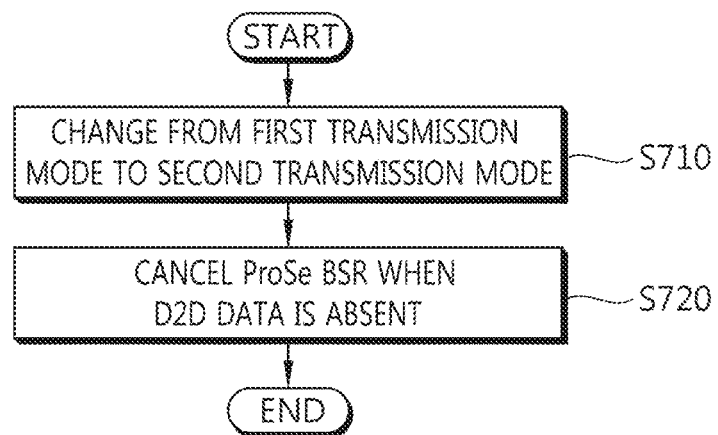

In another embodiment, as illustrated in FIG. 7, when the D2D transmission mode of the UE is changed from the first transmission mode to the second transmission mode due to the exceptional case in operation S710, the UE may determine whether to cancel a ProSe-BSR depending on whether there is data to be transmitted via D2D communication. For example, when the timer relating to the RRC re-establishment procedure and/or the timer relating to the handover is running and thus the D2D transmission mode of the UE is changed from the first transmission mode to the second transmission mode, the UE may cancel the ProSe-BSR only when there is no data to be transmitted via D2D communication in operation S720. Here, all the ProSe-BSR timers (periodic ProSe-BSR timer and retransmission ProSe-BSR timer) may be reset and not be started until the UE changes the D2D transmission mode to the first transmission mode. Herein, the 'reset' for the periodic BSR timer and the retransmission BSR time of the ProSe-BSR refers to stop and go to zero of a timer value on the periodic ProSe-BSR timer and the retransmission ProSe-BSR timer of the ProSe-BSR. In this case, the UE may also determine whether the resource pool information for the second transmission mode is present. When the resource pool information for the second transmission mode is present, the UE may exclude all PTCHs from an object of a triggered ProSe-BSR. When the resource pool information for the second transmission mode is absent, the UE may suspend data transmission via all PTCHs.

Figure 8:
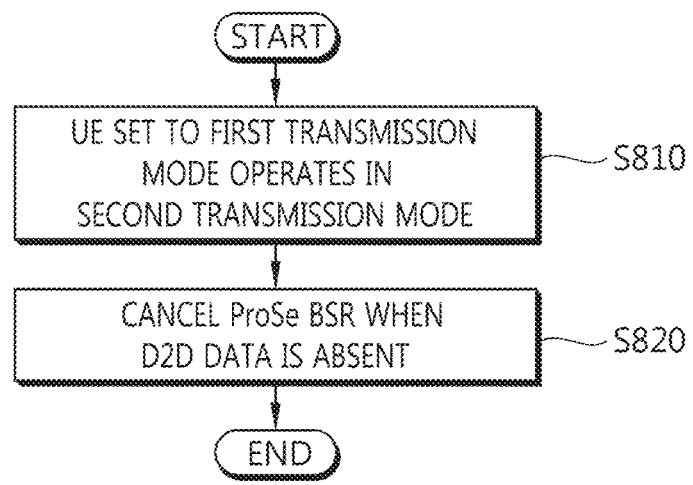

In still another embodiment, as illustrated in FIG. 8, the UE, which is in the first transmission mode, may operate in the second transmission mode without changing the D2D transmission mode in operation S810. This case may occur when the BS does not propose the D2D transmission mode of the UE and/or at least one of the timer relating to the RRC re-establishment procedure and the timer relating to the handover is running or started. In this case, when a D2D grant is received from the BS, the UE transmits D2D data in the first transmission mode even though the UE is capable of transmitting D2D data in the second transmission mode. That is, the UE may maintain the first transmission mode as the D2D transmission mode. In this case, although the UE starts to operate in the second transmission mode, the UE is in the first transmission mode and thus may not cancel triggering of a ProSe-BSR. However, the UE determines the presence of data to be transmitted via D2D communication, and may cancel the triggered BSR when there is no data to be transmitted via D2D communication in operation S820.

Meanwhile, when the exception case is released but the RRC connected mode is not maintained (that is, when an RLF related timer and/or the timer relating to the handover expires), the UE may change the D2D transmission mode to the second transmission mode. The UE may transmit D2D data based on obtained D2D resource pool information for the second transmission mode.

Alternatively, in the exceptional case, the UE may cancel a ProSe-BSR through an operation of resetting an MAC entity. The MAC entity may be reset by a request of an upper layer. The operation of resetting the MAC entity includes the following operations.

Suspend all running timers.

Set values of new data indicators (NDIs) with respect to all UL HARQ processes other than UL HARQ processes related to a PSCH to 0.

Cancel a triggered SR and/or ProSe-BSR procedure, if any.

Cancel a triggered BSR and/or ProSe-BSR procedure, if any.

Flush soft buffers with respect to all DL HARQ processes other DL HARQ processes related to the PSCH.

Consider transmission of a random TB received subsequently with respect to each DL HARQ process other than the DL HARQ processes related to the PSCH as very first transmission.

Here, a ProSe communication shared channel (PSCH) is a transport channel for D2D data transmitted from an MAC layer to a physical layer.

If the exceptional case occurs due to the start of the RRC re-establishment procedure, the UE suspends all DRBs other than DRBs related to a PTCH as a logical channel related to transmission of D2D data when the RRC re-establishment procedure is started. If the exceptional case occurs due to the start of the handover procedure (the RRC reconfiguration message including mobility control information (MCI), the UE re-establishes RLCs and PDCPs in all DRBs other than the DRBs related to the PTCH as the logical channel related to transmission of D2D data when the handover procedure is started.

When an MAC entity for D2D communication is separated from an MAC entity for radio communication, the MAC entity for D2D communication is rest and a ProSe-BSR is cancelled in the exceptional case.

Here, the UE, in which the exceptional case is in progress, does not trigger a ProSe-BSR even when transmittable data is present in an RLC and PDCP of a DRB related to the PTCH. That is, triggering a ProSe-BSR is possible only not in the exceptional case and when the UE is set to operate in the first transmission mode and is in the RRC connected mode.

Figure 9:
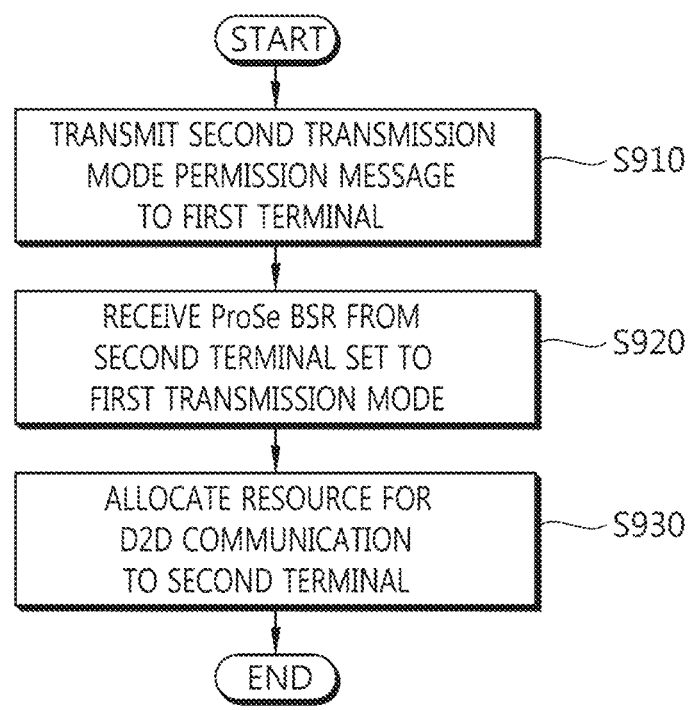
FIG. 9 is a flowchart illustrating a method for operating a buffer state report for D2D communication by a base station according to an exemplary embodiment.

FIG. 9 is a flowchart illustrating a method for operating a BSR for ProSe-BSR for D2D communication by a BS according to an exemplary embodiment.

Referring to FIG. 9, BS may transmit a second transmission mode permission message to a first UE in a coverage in operation S910. Here, the first UE may be a UE a D2D transmission mode of which is set to the first transmission mode. The first UE receiving the second transmission mode permission message may change the D2D transmission mode to the second transmission mode in the afore-described exceptional case.

When the first UE is changed to the second transmission mode, the BS may receive a ProSe-BSR from a second UE set to the first transmission mode other than the first UE in operation S920. Then, the BS may allocate a resource for D2D communication to the second UE based on the received ProSe-BSR in operation S930, and the second UE may perform D2D communication with a target UE using the allocated resource.

Alternatively, when an RRC reconfiguration message including mobility control information (MCI) is received from the BS, a UE may release a configuration for a transmission resource among configurations for ProSe communication operations, which is for indicating that configuration information for the first transmission mode or second transmission mode configured by a source BS is no longer valid since the UE moves to a target BS through handover.

For the release operation, release information may be transmitted as included in configuration information on the transmission resource in the RRC configuration message. Alternatively, when the RRC reconfiguration message including the mobility control information (MCI) is received from the BS, the UE may perform an operation of autonomously releasing the configuration information on the transmission resource in the RRC reconfiguration message.

As described above, when the configuration for the transmission resource for the first transmission mode or the second transmission mode is released, the UE operates in the second transmission mode in data transmission using normal common transmission resource pool information received through system information. Quality of service (QoS) of ProSe communication may be maintained even in the RRC idle mode using an available ProSe communication transmission resource, instead of the configuration information for the first transmission mode or the second transmission mode configured by the source BS which is released due to a handover operation as described above.

Alternatively, when the configuration for the transmission resource for the first transmission mode or the second transmission mode is released, the UE may operate in the fallback mode in data transmission using transmission resource pool information for an exceptional case received through system information. Although the configuration information for the first transmission mode or the second transmission mode configured by the source BS is released due to a handover operation, the UE maintains the RRC connected mode, QoS of ProSe communication may be maintained using the transmission resource pool information for the exceptional case available even in the RRC connected mode.

Here, the used transmission resource pool information may be resource pool information for ProSe communication provided by the target BS to the source BS (BS transmitting the RRC reconfiguration message including MCI) and be provided as included in the RRC reconfiguration message including MCI, and the UE may perform a transmission related operating based on the information provided by the target BS.

When there is no transmission resource pool information provided from the target BS or transmission resource pool information is not provided, transmission resource pool information in the system information previously received from the source BS may be used.

The UE may maintain the second transmission mode or fallback mode until the UE receives and reflects information for a configuration for a transmission resource among the configurations for the ProSe communication operations from the target BS after the handover is completed.

Alternatively, when the configuration for the transmission resource for the first transmission mode or the second transmission mode is released, the UE may maintain a reception operation but suspend all transmission operations. That is, the UE may operate in a ProSe transmission suspending mode. Since the configuration information for the first transmission mode or the second transmission mode configured by the source BS is released due to the handover as described above, a ProSe transmission operation is impossible. This is because when a physical resource in a transmission resource pool, which is dedicated by the source BS to a UE operating in the RRC connected mode for a transmission operation in the first transmission mode or the second transmission mode, collides with a physical resource in a transmission resource pool dedicated to the target BS, a ProSe communication signal transmitted based on transmission resource pool information on the source BS acts as interference with another ProSe communication signal in the target BS. Thus, the UE suspends the transmission operation in order to remove such an interference factor.

The UE may the transmission suspending mode until the UE receives and reflects the information for the configuration for the transmission resource among the configurations for the ProSe communication operations from the target BS after the handover is completed.

Here, the source BS and the target BS may be different from or the same as each other. When the source BS is the same as the target BS, a frequency band may or may not be changed due to handover. A BS or frequency band is not changed despite handover when the BS determines the RRC parameters of the BS and a UE are inconsistent with each other, the BS determines that DL or UP synchronization is not properly achieved, or the BS changes a key value shared between the BS and a UE for security.

Figure 10:
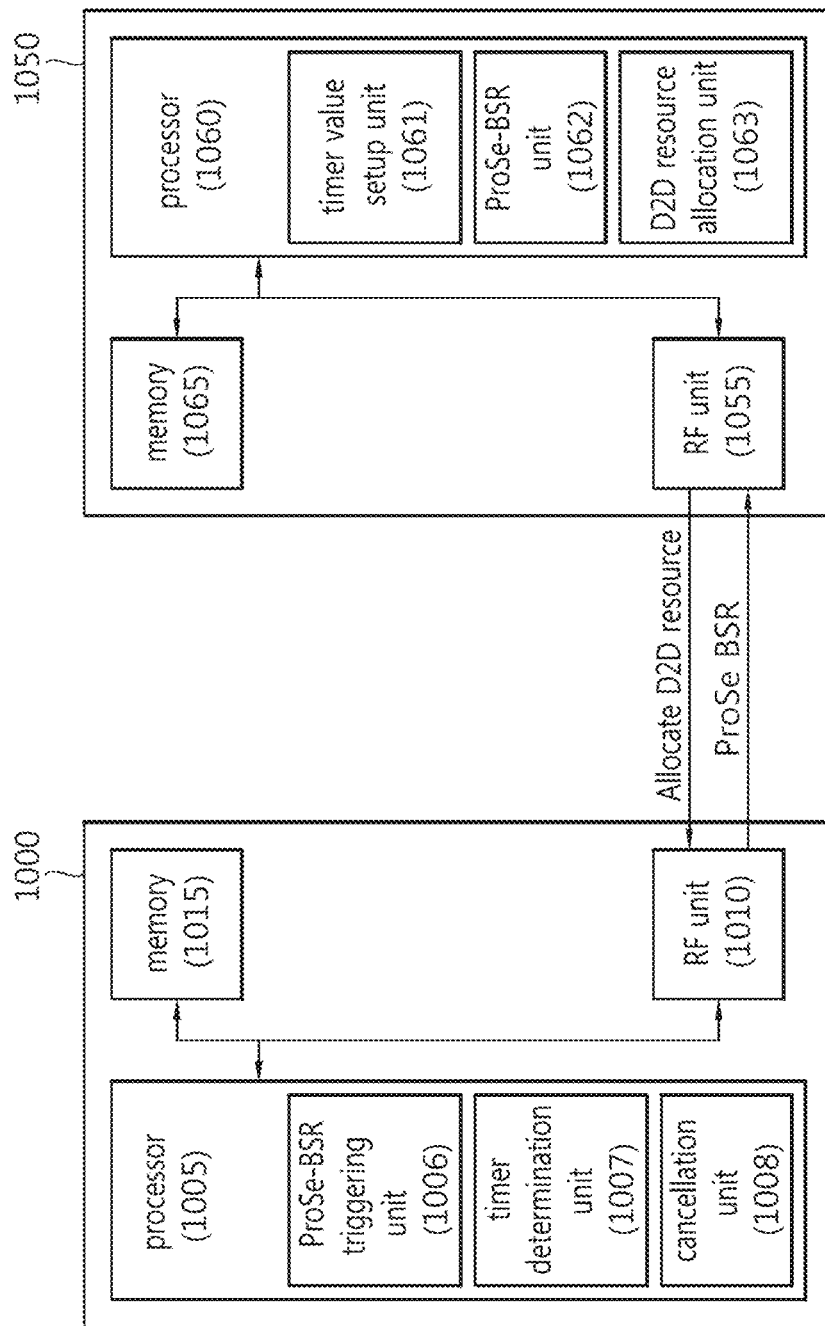
FIG. 10 is a block diagram illustrating a wireless communication system according to an exemplary embodiment.

FIG. 10 is a block diagram illustrating a wireless communication system according to an exemplary embodiment.

Referring to FIG. 10, the wireless communication system which supports D2D communication may include a UE 1000 and a BS (or cluster head) 1050.

The UE 1000 may include a radio frequency (RF) unit 1010 and a memory 1015. The memory 1015 may be coupled to a processor 1005 and store various pieces of information to operate the processor 1005. The RF unit 1010 may be coupled to the processor 1005, and may transmit and/or receive a wireless communication signal. For example, the RF unit 101 may receive, from the base station 1050, D2D resource allocation information and second transmission mode permission message described herein. Further, the RF unit 1010 may transmit an uplink signal, such as the ProSe-BSR described herein, to the base station 1050.

The processor may implement functions, processes, and/or methods described herein. Specifically, the processor 1005 may perform operations according to FIG. 4 through FIG. 8.

For example, the processor 1005 may include a ProSe-BSR triggering determination unit 1006, a timer determination unit 1007, and a cancellation unit 1008. The ProSe-BSR triggering determination unit 1006 determines whether a ProSe-BSR is triggered. The time determination unit 1007 determines whether a timer relating to an RRC re-establishment procedure and/or a timer relating to handover are running when a current D2D transmission mode of a UE is the second transmission mode. Upon detecting radio link failure (RLF), the initiation of the RRC connection re-establishment procedure is initiated, a timer T311 of the RRC connection re-establishment procedure is started.

The cancellation unit 1008 cancels all triggered ProSe-BSRs when the timer relating to the RRC re-establishment procedure and/or the timer relating to the handover are running. For example, when the first transmission mode as a Scheduled resource allocation to the second transmission mode as a UE autonomous resource selection according to the RRC re-establishment procedure by detecting radio link failure (RLF) of the cancellation unit 1008 of the UE, the UE may cancel all ProSe-BSRs triggered for an operation in the first transmission mode.

When a triggered ProSe-BSRs is cancelled, a periodic BSR timer (periodic ProSe BSR-timer) and a retransmission BSR timer (retx ProSe BSR-timer) configured for the ProSe-BSRs may be reset. The 'reset' for the periodic ProSe BSR timer and the retransmission ProSe BSR timer of the ProSe-BSR operates to stop and go to zero of a timer value on the periodic ProSe BSR timer and the retransmission ProSe BSR timer of the ProSe-BSR.

Meanwhile, the processor 1005 may verify whether resource pool information for the second transmission mode or resource pool information for the fallback mode is present. Herein, transmission resource pool information including the commTxPoolExceptional for an exceptional case as the fallback mode is checked by the processor 1005. When at least one of the two pieces of resource pool information, especially the transmission resource pool information including the commTxPoolExceptional for an exceptional case is present, the processor 1005 may exclude all PTCHs configured for D2D communication between UEs from an object of a triggered ProSe-BSR so that a ProSe-BSR is no longer triggered. When neither of the two pieces of resource pool information are present, the processor 1005 is incapable of operating in the second transmission mode and thus may suspend data transmission via the PTCHs.

Subsequently, when the timer determination unit 1007 determines that the timer relating to the RRC re-establishment procedure and/or the timer relating to the handover is stopped, the processor 1005 determines that the exceptional case is released and thus may start the reset periodic BSR timer and retransmission BSR timer and restart a normal ProSe-BSR procedure.

The memory 1015 may store the resource pool information for the second transmission mode, information on whether the second transmission mode is permitted, or the like according to the present specification and provide the resource pool information for the second transmission mode to the processor 1005 upon a request from the processor 1005.

The base station 1050 may include an RF unit 1055, a processor 1060, and a memory 1065. The memory 1065 may be coupled to the processor 1060, and store various pieces of information to operate the processor 1060. The RF unit 1055 may transmit or receive a wireless signal in coupling with the processor 1060. The processor 1060 may implement functions, processes, and/or method described herein. In exemplary embodiment illustrated above, the operations of a base station 1050 may be implemented as the processor 1060 and other components. The processor 1060 may generate the second transmission mode permission message described above, and schedule resources for a D2D communication based on the ProSe-BSR received from a UE.

For instance, the processor 1060 may include a timer value setup unit 1061, a ProSe-BSR verification unit 1062, and a D2D resource allocation unit 1063. The timer value setup unit 1061 may set up values of various timers specified in the present specification, especially for the timer T311, the periodic ProSe BSR timer, and the retransmission ProSe BSR timer of ProSe-BSR. The timer values set up by the timer value setup unit 1061 may be transmitted to the UE through an RF unit 1055. The ProSe-BSR verification unit 1062 may verify a ProSe-BSR received from the UE 1000. The D2D resource allocation unit 1063 may allocate a resource for D2D communication to the UE 1000 operating in a first transmission mode based on the ProSe-BSR. The D2D resource allocation unit 1063 also allocates the transmission resource pool information of commTxPoolExceptional for the exceptional case as the fallback mode. Herein the all resource pool information including the commTxPoolExceptional may be transmitted to all UEs in a corresponding cell through a broadcast channel by the processor 1060. According to an exemplary embodiment, the UE 1000 may include a wireless transceiver and one or more processors. The wireless transceiver may be the RF unit 1010 or may include the RF unit 1010. The one or more processors may be the processor 1005. The processor 1005 may be configured as a single processor or multiple processors.

The wireless transceiver may establish a radio resource control (RRC) connection with an evolved NodeB (eNB) and receive configuration information associated with a D2D communication from the eNB. The configuration information may include information of a resource allocation mode for a D2D data transmission and information of a timer associated with a BSR for a D2D data transmission. The one or more processors may be configured to determine a radio link failure (RLF), to initialize a re-establishment process for the RRC connection, to cancel all BSRs for a D2D data transmission in response to the determined RLF, and to initialize the timer associated with a BSR for a D2D data transmission. The RLF may be associated with a connection problem of the RRC connection, and the canceled BSRs for a D2D data transmission may be associated with a D2D data transmission scheduled by the eNB.

Further, the one or more processors may initialize a periodic BSR-timer and a retransmission BSR-timer (retx BSR-timer). For example, the one or more processors may stop the periodic BSR-timer and the retx BSR-timer and set timer values of the periodic BSR-timer and the retx BSR-timer as zero.

The wireless transceiver may receive information of a resource selection mode. In the resource selection mode, the one or more processors may be configured to select a resource for transmitting D2D data from a resource pool indicated by the information of a resource selection mode.

The one or more processors may be configured to determine a change from the resource allocation mode for a D2D data transmission to a resource selection mode when an exceptional case occurs. In the resource selection mode, the one or more processors may be configured to select a resource for transmitting D2D data from a resource pool. The exception case may include a case where upon detecting the RLF, the initialization of the re-establishment process for the RRC connection has been initiated and a T311 timer associated with the re-establishment process for the RRC connection has been started.

The wireless transceiver may receive information of CommTxPoolExceptional for a D2D data transmission for the exceptional case. The CommTxPoolExceptional indicates information of a resource pool for a D2D data transmission when the exception case occurs. The wireless transceiver may receive the CommTxPoolExceptional from the eNB through a broadcast channel. The CommTxPoolExceptional is included in a System Information Block (SIB). The wireless transceiver may transmit D2D data by selecting, by the processor, a resource based on information of CommTx- PoolExceptional, the CommTxPoolExceptional indicating resource pool information for a D2D data transmission when the exceptional case occurs.

According to an exemplary embodiment, the wireless transceiver may establish a radio resource (RRC) connection with an evolved NodeB (eNB) and receive configuration information associated with a D2D communication from the eNB, the configuration information comprising information of a resource allocation mode for a D2D data transmission. The one or more processors may operate a UE in a first transmission mode for a D2D communication, the first transmission mode corresponding to the resource allocation mode. The one or more processors may transition from the first transmission mode to a second transmission mode in response to determining the exceptional case. The second transmission mode corresponds to a resource selection mode in which the UE selects a resource for transmitting D2D data from a resource pool. The one or more processors may cancel at least one triggered BSR for a D2D data transmission in response to determining the exceptional case, the canceled BSR for a D2D data transmission being associated with a D2D data transmission scheduled by the eNB.

The one or more processors may initialize a timer associated with a BSR for a D2D data transmission in the second transmission mode. The initialized timer restarts when the UE transitions into the first transmission mode from the second transmission mode. A periodic BSR-timer and a retransmission BSR-timer (retx BSR-timer) may be reset in response to determining the exceptional case.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. One or more non-transitory computer readable storage media encoded with instructions that, when executed by a processor, cause the processor to perform operations, comprising:
receiving, by a wireless device from a base station, one or more messages comprising information of a resource allocation mode for direct data transmission between wireless devices;
determining, by the wireless device, a radio link failure (RLF) associated with a radio resource control (RRC) connection; and
based on the determined RLF:
canceling buffer status reports (BSRs) for direct data transmission, wherein the canceled BSRs for direct data transmission are associated with at least one direct data transmission, between wireless devices, scheduled by the base station;
selecting, based on a configuration parameter indicating a plurality of resources of a resource pool via which the wireless device is allowed to transmit data to at least one wireless device in an exceptional condition, at least one resource associated with the exceptional condition; and
transmitting, via the at least one resource associated with the exceptional condition, data to a second wireless device.

2. The media of claim 1, the operations further comprising-resetting, based on the determined RLF, a timer associated with the BSRs for direct data transmission.

3. The media of claim 2, wherein resetting of the timer associated with the BSRs for direct data transmission comprises:
resetting a periodic BSR-timer and a retransmission BSR-timer (retx BSR-timer).

4. The media of claim 3, wherein resetting of the periodic BSR-timer and the retx BSR-timer comprises:
stopping the periodic BSR-timer and the retx BSR-timer; and
resetting timer values of the periodic BSR-timer and the retx BSR-timer.

5. The media of claim 1, the operations further comprising:
receiving information of a resource selection mode; and
changing, based on the determined RLF, from the resource allocation mode to the resource selection mode,
wherein in the resource allocation mode, the base station schedules resources for direct data transmission between wireless devices.

6. The media of claim 1, the operations further comprising:
determining, based on an occurrence of the exceptional condition, a change from the resource allocation mode to a resource selection mode,
wherein an exceptional condition comprises at least one of:
an RLF;
a re-establishment process for the RRC connection that has been initiated; and
T311 timer associated with the re-establishment process for the RRC connection has been started.

7. The media of claim 1, the operations further comprising:
receiving, via a System Information Block (SIB) or a broadcast channel, the configuration parameter indicating the plurality of resources of the resource pool via which the wireless device is allowed to transmit data to at least one wireless device in the exceptional condition.

8. The media of claim 1, the operations further comprising initializing a re-establishment process for the RRC connection.

9. One or more non-transitory computer readable storage media encoded with instructions that, when executed by a processor, cause the processor to perform operations, comprising:

receiving, by a wireless device from a base station, one or more messages comprising information of a resource allocation mode for direct data transmission between wireless devices;

triggering, while the wireless device is operating in the resource allocation mode, a buffer status report (BSR) for direct data transmission;

determining, after the triggering, that a timer associated with a handover of the wireless device is running; and based on the determining that the timer associated with the handover of the wireless device is running:

canceling BSRs for direct data transmission, wherein the canceled BSRs for direct data transmission are associated with at least one direct data transmission, between wireless devices, scheduled by the base station and associated with the resource allocation mode;

selecting, based on a configuration parameter indicating a plurality of resources of a resource pool via which the wireless device is allowed to transmit data to at least one wireless device in an exceptional condition, at least one resource associated with the exceptional condition; and transmitting, via the at least one resource associated with the exceptional condition, data to a second wireless device.

10. The media of claim 9, the operations further comprising:

receiving at least one of:
a radio resource control (RRC) reconfiguration message comprising mobility control information, or
a cell change order message; and
starting, based on the RRC reconfiguration message or the cell change order message, the timer associated with the handover of the wireless device.

11. The media of claim 9, wherein the timer associated with the handover of the wireless device comprises a T304 timer.

12. The media of claim 9, the operations further comprising:

stopping, after completing the handover, the timer associated with the handover of the wireless device; and
changing, based on the stopping the timer, from a resource selection mode to the resource allocation mode.

13. The media of claim 9, the operations further comprising:

determining, based on an occurrence of the exceptional condition, a change from the resource allocation mode to a resource selection mode,
wherein the exceptional condition comprises: a T304 timer associated with the handover has been started.

14. The media of claim 9, the operations further comprising:

receiving, via a System Information Block (SIB) or a broadcast channel, the configuration parameter indicating the plurality of resources of the resource pool via which the wireless device is allowed to transmit data to at least one wireless device in the exceptional condition.

15. A wireless device comprising:
a transceiver to communicate with a base station;
one or more processors; and
memory storing instructions that, when executed by the one or more processors, cause the wireless device to:

receive, from a base station, one or more messages comprising information of a resource allocation mode for direct data transmission between wireless devices;

trigger, while the wireless device is operating in the resource allocation mode, a buffer status report (BSR) for direct data transmission;

determine, after the triggering, that a timer associated with a handover of the wireless device is running; and based on the determining that the timer associated with the handover of the wireless device is running:

cancel BSRs for direct data transmission, wherein the canceled BSRs for direct data transmission are associated with at least one direct data transmission, between wireless devices, scheduled by the base station and associated with the resource allocation mode;

select, based on a configuration parameter indicating a plurality of resources of a resource pool via which the wireless device is allowed to transmit data to at least one wireless device in an exceptional condition, at least one resource associated with the exceptional condition; and transmit, via the at least one resource associated with the exceptional condition, data to a second wireless device.

16. The wireless device of claim 15, wherein the instructions, when executed by the one or more processors, cause the wireless device to:

receive at least one of:
a radio resource control (RRC) reconfiguration message comprising mobility control information, or
a cell change order message; and
start, based on the RRC reconfiguration message or the cell change order message, the timer associated with the handover of the wireless device.

17. The wireless device of claim 15, wherein the timer associated with the handover of the wireless device comprises a T304 timer.

18. The wireless device of claim 15, wherein the instructions, when executed by the one or more processors, cause the wireless device to:

stop, after completing the handover, the timer associated with the handover of the wireless device; and
change, based on the stopping the timer, from a resource selection mode to the resource allocation mode.

19. The wireless device of claim 15, wherein the instructions, when executed by the one or more processors, cause the wireless device to:

determine, based on an occurrence of the exceptional condition, a change from the resource allocation mode to a resource selection mode, wherein the exceptional condition comprises a T304 timer associated with the handover has been started.

20. The wireless device of claim 15, wherein the instructions, when executed by the one or more processors, cause the wireless device to:

receive, via a System Information Block (SIB) or a broadcast channel, the configuration parameter indicating the plurality of resources of the resource pool via which the wireless device is allowed to transmit data to at least one wireless device in the exceptional condition.

* * * * *

UNITED STATES PATENT AND TRADEMARK OFFICE
CERTIFICATE OF CORRECTION

| | | |
|---|---|---|
| PATENT NO. | : 12,048,043 B2 | Page 1 of 1 |
| APPLICATION NO. | : 18/198049 | |
| DATED | : July 23, 2024 | |
| INVENTOR(S) | : Ki Bum Kwon | |

It is certified that error appears in the above-identified patent and that said Letters Patent is hereby corrected as shown below:

In the Claims

Claim 2, Column 24, Lines 16-17, replace "comprising-resetting, based on the" with --comprising resetting, based on the--

Signed and Sealed this
Nineteenth Day of November, 2024

Katherine Kelly Vidal
*Director of the United States Patent and Trademark Office*